(12) United States Patent
Zahl et al.

(10) Patent No.: US 10,693,971 B2
(45) Date of Patent: Jun. 23, 2020

(54) IDENTIFYING THE BEST SUITABLE APPLICATION TO OPEN A FILE SHARED VIA A LINK

(71) Applicant: Microsoft Technology Licensing, LLC, Redmond, WA (US)

(72) Inventors: Brandon Philip Zahl, Seattle, WA (US); Daron Spektor, Seattle, WA (US); Hui Huang, Bellevue, WA (US); Jonathan Alexander Bockelman, Kirkland, WA (US); Rafael Lopez-Uricoechea, Seattle, WA (US); Peter Eberhardy, Seattle, WA (US); Alisa Yujin So, Kirkland, WA (US); Kevin Kaiwon Lam, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 211 days.

(21) Appl. No.: 15/901,817

(22) Filed: Feb. 21, 2018

(65) Prior Publication Data
US 2019/0260836 A1 Aug. 22, 2019

(51) Int. Cl.
*H04L 29/08* (2006.01)
*H04L 29/06* (2006.01)

(52) U.S. Cl.
CPC ............ *H04L 67/146* (2013.01); *H04L 67/06* (2013.01); *H04L 67/2842* (2013.01); *H04L 67/32* (2013.01)

(58) Field of Classification Search
CPC ....... H04L 67/146; H04L 67/06; H04L 67/32; H04L 67/2842

USPC ........................................................ 709/217
See application file for complete search history.

(56) References Cited

U.S. PATENT DOCUMENTS

| | | | | |
|---|---|---|---|---|
| 9,519,726 | B2* | 12/2016 | Kumar | G06F 16/957 |
| 9,740,751 | B1* | 8/2017 | Yeom | G06F 16/24578 |
| 2012/0323898 | A1* | 12/2012 | Kumar | G06F 16/24578 |
| | | | | 707/723 |
| 2018/0152528 | A1* | 5/2018 | Gupta | G06F 16/9566 |

OTHER PUBLICATIONS

"Handling Android App Links", Retrieved From <<https://developer.android.com/training/app-links/index.html>>, Retrieved on: Dec. 29, 2017, 2 Pages.

(Continued)

*Primary Examiner* — Minh Chau Nguyen
(74) *Attorney, Agent, or Firm* — Newport IP, LLC; Jacob P. Rohwer

(57) ABSTRACT

The techniques enable a device to identify a best suitable application to open a resource such as a file. The file can be shared via a link or can be attached to a communication. The link comprises a uniform resource locator (URL) or is in some way associated with an underlying URL. The URL includes a pattern, or a portion that identifies a domain (e.g., a hostname) and/or a portion that identifies a type of file that is to be accessed and opened. Upon activation of the link, the device analyzes the URL to determine the pattern. The device then obtains, from a service associated with the URL, a ranked list of applications that are authorized to open the file. Moreover, the device performs, at run-time, a negotiation with the service to determine which application is best suited to open the file.

20 Claims, 10 Drawing Sheets

(56) References Cited

OTHER PUBLICATIONS

"Universal Links for Developers", Retrieved From <<https://developer.apple.com/ios/universal-links/>>, Retrieved on: Dec. 29, 2017, 2 Pages.

Oviedo, Juan Sebastian, "Web-to-App Linking with AppUriHandlers", Retrieved From <<https://blogs.windows.com/buildingapps/2016/10/14/web-to-app-linking-with-appurihandlers/≠sfV5uKb2vWVtgss2.97>>, Oct. 14, 2016, 13 Pages.

\* cited by examiner

US 10,693,971 B2

IDENTIFYING THE BEST SUITABLE APPLICATION TO OPEN A FILE SHARED VIA A LINK

BACKGROUND

As storage and networking resources continue to develop, it has become easier for users to share content with one another. For example, rather than a first user attaching a file to a message and sending the message to a second user over the network, the first user can have a link to the file generated and sent to the second user. The link provides access to the file via a uniform resource locator (URL) which is used to locate the file on a network (e.g., the Internet or World Wide Web). This can help conserve networking, processing, and/or storage resources.

Currently, when a device determines that a link has been activated (e.g., a user clicks on the link contained in a message), the device is configured to call on an application to open the file, so a user can view and/or interact with contents of the file. The application called upon can be a web application accessible via a browser installed on the device, or the application can be a separate client application installed on the device. For instance, upon installation, a client application registers with an operating system of the device so that the client application can be invoked when an analysis of an underlying URL associated with a link reveals a given domain (e.g., a hostname). Stated another way, the client application declares in advance, to the operating system, a desire to open files to be accessed via the given domain. In some specific examples, a first application developed by YOUTUBE can register to open files from the "www.youtube.com" domain. A second application developed by GOOGLE can register to open files from the "docs.google.com" domain. A third application developed by MICROSOFT can register to open files from the "1drv.ms" domain. A fourth application developed by BANK OF AMERICA can register to open files from the "www.bofa.com" domain.

As the number of client applications (apps) available for consumers to download to their personal devices continues to increase, this process creates situations where multiple applications are registered to open a file. For example, an entity may operate a network storage service (e.g., cloud storage service) configured to store and/or backup files in a user account. The entity may also develop and offer for installation multiple different client applications that are capable of opening and interacting with the files stored in the network storage service (e.g., the MICROSOFT WORD app and the MICROSOFT ONEDRIVE app, etc.). Each application registered to open files may have different features available and/or enabled, which allows a device and/or a user to display, manipulate, edit, communicate, and/or otherwise process contents of the file (e.g., file data) in different ways.

In such situations where there are multiple applications registered to open a file, conventional techniques obtain a prioritized list of applications that are authorized to open files accessed via a given domain. The prioritized list ranks the authorized client applications based on priority and may be referred to herein as a ranked list of applications. This ranked list, however, is static in nature. This means that the application that has the highest ranking on the list and that is available to the operating system of the device is always called upon to open a file accessed via the given domain. Stated another way, the operating system fully respects the ranked order of the list and does not implement any functionality to deviate from the ranked order.

These conventional techniques that use the ranked list have shortcomings in that the determined priority of applications fails to consider capabilities of the applications available to the device to open a file. The capabilities can be associated with available and/or enabled features for individual applications. For example, the ranked list does not take into account application versions (e.g., an application identifier on the ranked list identifies the application but does not identify a version of the application). Accordingly, an application may obtain the highest ranked position on the list because of a recently released feature that enables a user to interact with the contents of a file in a new way, thereby providing an improved and optimal experience for the user. However, the user may not have installed the most recent update (i.e., version) to the application. Rather, the device may be executing an older version of the application that does not contain the recently released feature. In this particular scenario, an alternative application that has a lower ranked position on the list, but that may have been updated to the most recent version by the user, may be available for use on the device. This alternative application may include the recently released feature. Consequently, it would be a better experience for the user to have the file opened using the lower ranked application rather than the higher ranked application. However, the operating system's strict adherence to the static order of the ranked list does not allow this, and therefore, a user experience in relation to opening a file and interacting with contents of the file can be frustrated.

SUMMARY

The techniques disclosed herein enable a device to identify a best, or most, suitable application to open a resource such as a file. In various embodiments, access to a resource is shared via a link. The link can be provided in the body of a communication, or as an attachment to a communication. The link comprises a uniform resource locator (URL) or is in some way associated with an underlying URL (e.g., the link may be a hyperlink). The URL generated in accordance with the techniques described herein includes a pattern. The pattern can include a portion that identifies a domain (e.g., a hostname), as well as a portion that identifies a type of resource (e.g., file) that is to be accessed and opened. In some instances, as further described herein, the URL can also include a portion that identifies application capabilities (e.g., features) that are required and/or preferred in order to provide the best possible user experience with relation to opening and/or interacting with the contents of the resource.

Upon activation of the link (e.g., a user touches or clicks the link on a display), the device analyzes the URL to determine the pattern (e.g., the domain and/or the type of file to be accessed and opened). For example, in the URL "https://1drv.ms/w/*", the domain comprises "1drv.ms", the "w" is known to indicate that a WORD file is the type of file to be opened, and the "*" is a placeholder that further defines a path to a specific file and/or capabilities associated with the specific file (e.g., "*" represents any series of characters useable to identify and locate a specific file). In another example, in the URL "https://1drv.ms/x/*", the domain comprises "1drv.ms", the "x" is known to indicate that an EXCEL file is the type of file to be opened, and again the "*" is a placeholder that further defines a path to a specific file and/or capabilities associated with the specific file. Accordingly, non-limiting examples of files to be accessed and opened can include a document, a spreadsheet, a slide deck, a video clip, an audio clip, a drawing, an image, a photograph, a web page, and so forth. These example resources can vary in types (e.g., file formats). In accordance with examples described herein, a file is used as an example resource.

An entity associated with the URL or domain can provide a service that stores a file on a network. Based on a determination of the domain, the device is configured to obtain, from the service, a ranked list of applications that are authorized to open the file and/or other files (e.g., based on the type of file). One reason the ranked list of authorized applications is retrieved by the device is to ensure that malicious software installed on the device does not gain access to confidential or secured files. In other words, the service is able to implement an element of security and/or control related to which applications can open the file. After or in association with obtaining the ranked list of applications that are authorized to open the file, the device performs a negotiation with the service to determine which application on the ranked list is best suited to open the file. This negotiation provides a mechanism to override and/or alter the priority of the applications included in the ranked list, as described above, in order to provide a user with an improved and optimal experience. For instance, if it is determined that the highest ranked application on the list is incapable of providing a particular feature that enables a user to interact with some of the contents of the file, and/or if it is determined that an alternative application on the list is capable of providing the particular feature, then the highest ranked application may not be called upon to open the file.

The negotiation includes the provision of information about the file. The information can include capabilities associated with opening the file (e.g., displaying or outputting file data for consumption, arranging file data, etc.), capabilities associated with interacting with contents of the file (e.g., manipulating file data, editing file data, etc.), and/or capabilities associated with processing the contents of the file. In various examples, an application has a capability if the application is configured to execute a particular feature that enables contents of the file to be displayed in a particular way and/or that enables a user to interact with the contents of the file in a particular way. In other words, the particular feature is available to the application or enabled in the application.

Using the capabilities, a component (e.g., a client application, the operating system, a helper application, etc.) on the device can determine which application, that is available to the device and that is on the list, is best suited to open the file. In one example, if a first client application called upon by the operating system determines that it is not the application best suited to open the application, the first client application can be configured to invoke or launch a second application, such as the web application, which is or is likely to be best suited to open the file. The first client application may know that it cannot provide the best experience because, in association with provision of the capabilities, the service can inform the first client application whether the capability is supported in an accessible web application (e.g., the mobile web application for a mobile platform/experience, the desktop web application for a desktop platform/experience, etc.). If the first client application cannot provide a capability and the web application also does not support the capability, the first client application may determine that it is best suited to open the application. Alternatively, the first client application may know that it cannot provide the best experience because it may be aware of the capabilities of other applications. In another example, the operating system or a separate helper application can be configured to coordinate capabilities of available applications, store the capabilities in a registry, compare the capabilities of the available applications to the received capabilities associated with a file, and determine which application available to the device is best suited to open the file (e.g., which application possesses capabilities that best match or satisfy the capabilities received from the service).

In various examples, the capabilities can be divided into sub-categories, such as "required" capabilities that are needed to open the file and to enable interaction with the contents of the file, and "optional" capabilities that are preferred to optimize the user experience but are not necessarily needed to open the file and to enable interaction with the contents of the file. The device obtains the information about the file from the service associated with the domain. Subsequently, it can be determined whether a first identified application (e.g., the highest ranked application on the list that is available to the device) possesses the capabilities to provide a best possible experience for the user, as it relates to opening a file and enabling interaction with the contents of the file. If the first identified application is unable to provide the best possible experience for the user, the techniques identify a next application (e.g., the second highest ranked application on the list that is available to the device) and determine whether it possesses the capabilities to provide a best possible experience for the user.

The capabilities can be generated based on the contents of the file. The capabilities can be generated by the service based on an examination or evaluation of the contents of the file. For example, the capabilities can be generated by the service as the contents of the file are generated and/or when the file is stored in a cloud storage service account that allows a user to store files of various types in one place, to access the files from any device able to connect to the Internet, and to share the files with other users via links. As described above, the capabilities can be related to a way in which a user consumes the contents of the file and/or is able to interact with the contents of the file. For example, a capability may be associated with a "comment only" feature that protects a user's original content in a file and only enables another user (e.g., a reviewer) to comment on the original content. In another example, a capability may be associated with a "voice comments" feature that enables data representing embedded voice comments to be displayed, selected, and upon selection, played-back to a user as an audible comment. In yet another example, a capability may be associated with a "tracked changes" feature that enables a viewer to see distinctions between original content and edited content (e.g., marked-up content). The capabilities can additionally or alternatively be generated based on features of a URL. For example, a portion of a URL can represent a capability, or instruction, of an application to navigate to a specific part of the file (e.g., a specific paragraph, a specific comment, a specific drawing, etc.). In another example, a portion of a URL can represent a capability associated with user permission to access the file, and thus, the capability is associated with a new authentication mechanism that may or may not be supported by an application.

The categorization of a capability as a required or an optional capability can also be based on the contents of the file. For instance, if a file contains voice comments, the default action for the service may be to categorize a "voice comments" feature as an optional capability. However, if a first user specifically mentions a name of a second user in a voice comment, then the service may categorize a "voice comments" feature as a required capability (e.g., when a link is sent to a device of the second user).

In some examples, the service considers or follows user input when generating and/or categorizing capabilities for a file. For example, a user can provide input indicating that the "voice comments" feature is a required capability for any application that opens the file. The input can be provided when the link is generated for sharing purposes. Stated another way, the user can define required and/or optional capabilities when sharing the file. In various examples, the capabilities defined by the user can generally be applied each time the file is shared via a link. In alternative examples, the capabilities defined by the user can be applied on a per-share or per-link basis based on a particular user to which the link and file are being sent.

In further embodiments, a device can implement its own scan or evaluation of a file that is attached to a communication in order to determine a particular type of the file and/or capabilities associated with opening the file and interacting with the file (e.g., features used to compose the contents of the file). Once the capabilities are known, the device can compare the capabilities associated with the file to capabilities possessed by each of multiple applications available to the device to open the file. The device can identify the application best suited to open the file based on a highest number of capability matches (e.g., the identified application possesses the most capabilities which are associated with the file). In the event of a tie (e.g., two or more applications can support all the capabilities associated with the file), the device can select the application that is the highest ranked on the list.

Compared to the conventional techniques that strictly follow an ordered ranking without regard to application capabilities that enable a user to view and/or interact with the contents of the file differently, the techniques described herein consider such application capabilities to determine an application that is best suited to open the file. This provides greater flexibility on a per-link and/or a per file basis which thereby allows a user to view and/or interact with contents of a file in an improved and optimal manner.

In further examples, the techniques are configured to cache details of a negotiation and/or how a file was opened, so that the negotiation does not have to be repeated with the service when the link is subsequently activated (e.g., the user accesses an old message and clicks on the link again). The caching reduces the time required to load the contents of the file and limits further network communications, thereby conserving resources. Moreover, the details can be used to intelligently determine if a previous outcome, as to which application is best suited to open the file, needs to be modified or overridden. For instance, the cached information can capture reasons why an application was determined to be the best suitable application to open the file and/or why an application was not determined to be the best suitable application to open the file. In a specific example, information stored in the cache may indicate that when the link was first activated, a first application lacked a particular capability to open a file due to the fact a user had not installed the most recent update (e.g., version) to the first application, where the most recent update includes the particular capability. Accordingly, the information stored in the cache may indicate that when the link was first activated, an alternative application that was ranked lower on the list than the first application, but that had the particular capability was determined to be the best suitable application to open the file. In an event the user installs the most recent update to the first application after the user first activates the link but before the user subsequently activates the link, the information in the cache can be accessed to determine that now the first application has the particular capability which it previously did not have. Consequently, the first application, rather than the alternative application, can be used to open the file based on a subsequent activation of the link.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The techniques disclosed herein enable a device to identify a best, or most, suitable application to open a resource such as a file that is shared via a link. The link comprises a uniform resource locator (URL) or is in some way associated with an underlying URL. The URL generated in accordance with the techniques described herein includes a pattern. The pattern can comprise a portion that identifies a domain (e.g., a hostname), as well as a portion that identifies a type of file that is to be accessed and opened. Upon activation of the link, the device analyzes the URL to determine the domain and the type of file to be accessed and opened. The device then obtains, from a service associated with the domain, a ranked list of applications that are authorized to open the file. Moreover, the device performs, at run-time, a negotiation with the service to determine which application on the ranked list is best suited to open the file. This negotiation provides a mechanism to override and/or alter the priority of the applications included in the ranked list in order to provide a user with an improved and optimal experience.

It should be appreciated that the subject matter described herein may be implemented as a computer-controlled apparatus, a computer process, a computing system, or as an article of manufacture such as a computer-readable storage medium. Among many other benefits, the techniques described herein improve efficiencies with respect to a wide range of computing resources. For instance, human interactions with a device may be improved as the techniques disclosed herein are configured to identify an application that provides a best possible user experience. The techniques disclosed herein can also conserve networking, storage, and/or processing resources based on the manner in which a file can be shared (e.g., via a link) and the way in which information can be cached to avoid further negotiation (e.g., when a link is subsequently activated at a later time). Other technical effects other than those mentioned herein can also be realized from implementations of the technologies disclosed herein.

Figure 1:
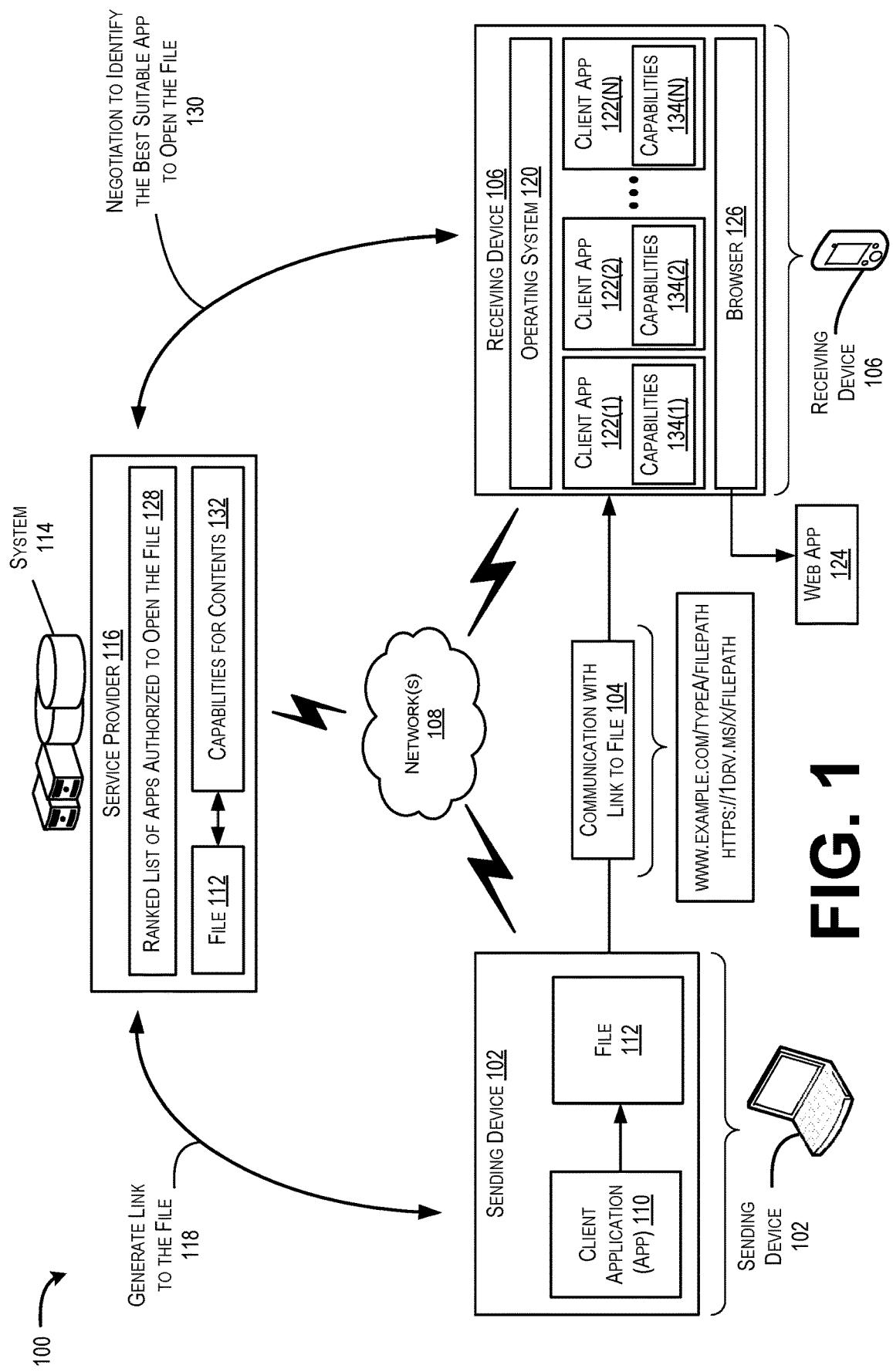
FIG. 1 includes a diagram that illustrates an example environment in which a link to a file is shared and a negotiation is implemented to identify a best suitable application to open the file.

FIG. 1 includes a diagram 100 that illustrates an example environment in which a link to a file is shared and a negotiation is implemented to identify a best suitable application to open the file. The techniques described herein can be implemented by various systems and/or computing devices, over various networks, as further described herein with respect to FIGS. 8 and 9. In FIG. 1, a sending device 102 is configured to transmit a communication 104 with a link to a file to a receiving device 106, via one or more network(s) 108. In various examples, the sending device 102 may be using a client application 110 to compose, edit, and/or access a file 112. The file 112 may be stored locally at the sending device 102, and also stored (e.g., backed-up) by a system 114 (e.g., a cloud storage system). The file being accessed via a URL, as described herein, comprises the copy of the file 112 stored by the system 114.

The system 114 can comprise devices and/or components operated by a service provider 116. Based on instruction from a user of the sending device 102, the sending device 102 and the service provider 116 can interact with each other to generate a link to the file 112 being stored. This enables the user of the sending device 102 to generate the communication 104 with the link to the file, which is transmitted (e.g., shared) with the receiving device 106. The communication 104 can be a message such as a text message, an electronic mail message, a social media message, a message submitted to a comment section of a video conference, and so forth. The link to the file can be embedded in a body of the communication and/or the link to the file can be included in an attachment to the communication (e.g., a selectable object).

The link can comprise a URL or in some way be associated with a URL (e.g., a hyperlink). The URL comprises a pattern that includes a first a portion that identifies a domain (e.g., a hostname) and/or a second portion that identifies a type of file that is to be accessed and opened at the receiving device 106. The domain identifies the service provider 116. As shown, a first example URL in the communication 104 includes a first portion that identifies the domain "www.example.com" and a second portion that identifies the type of file "typeA". A second example URL in the communication 104 includes a first portion that identifies the domain "1drv.ms" and a second portion that identifies the type of file "x". The URL can also include other portions that identify a pathname and/or a filename that is used to access the file, as well as a protocol (e.g., "https").

After the receiving device 106 receives the communication 104, the URL is activated or is in some way invoked to access the file 112 stored by the service provider 116. For instance, a user of the receiving device 106 may employ a messaging application to open the communication 104 and touch or click on the link to the file. Upon activation of the URL, an operating system 120 of the receiving device 106 is tasked with determining a way in which the file 112, accessible via the URL, is to be opened. More specifically, the operating system 120 is configured to help determine which application, from multiple different applications available to the receiving device 106, is to open and/or display the contents of the file 112.

The multiple different applications may include client applications 122(1) through 122(N) (where N is a positive integer number such as 1, 2, 3, 4, 5, and so forth). Client applications 122(1) through 122(N) are available to open the file because they have individually registered with the operating system 120 to open files of the particular type that are to be accessed via a given domain (e.g., "www.example.com", "1drv.ms", etc.). Stated another way, the client applications 122(1) through 122(N) are registered to be matched with the pattern of the URL. Accordingly, the operating system 120 is configured to analyze (e.g., parse) the URL to identify the domain and the type of file to be accessed in order to determine which applications are available to the receiving device 106 to open the file. The multiple different applications available to open the file 112 may also include a web application 124 that is made available via a browser 126 of the receiving device 106 over the network(s) 108. The web application 124 may be hosted and/or operated by the service provider 116.

To help determine which application is to open the file via the URL, the operating system 120 is configured obtain, from a service associated with the domain, a ranked list of applications 128 that are authorized to open the file. The operating system 120 and/or individual client applications 122(1) through 122(N) are also configured to implement a negotiation 130, at run-time, to identify the best suitable application to open the file. The negotiation 130 is implemented to determine which available application possesses capabilities that satisfy capabilities 132 for contents of the file (e.g., the application possesses all the capabilities 132). In some examples, the negotiation 130 determines which available application possesses capabilities that best satisfy the capabilities 132 for the contents of the file (e.g., the application does not possess all the capabilities 132 but possesses more capabilities compared to other available applications).

As described above, although client applications 122(1) through 122(N) and web application 124 are configured to open the same type of file, the capabilities related to how the contents of the file are displayed and/or interacted with can vary from one application to the next. Consequently, client application 122(1) includes a first set of capabilities 134(1), client application 122(2) includes a second set of capabilities 134(2), client application 122(N) includes an Nth set of capabilities 134(N), and web application 124 includes web set of capabilities, which are implemented by the service provider 116 and can be made known to the operating system 120 and/or the client applications 122(1) through 122(N).

The negotiation 130 provides a mechanism to override and/or alter the priority of the applications included in the ranked list of applications 128, in order to provide a user with an improved and optimal experience. For instance, if the highest ranked application on the list is incapable of providing (e.g., supporting) a particular feature that enables a user to interact with some of the contents of the file, then the highest ranked application may not be called upon to open the file.

The capabilities 132 can be divided into sub-categories, such as "required" capabilities that are needed to open the file 112 and to enable interaction with the contents of the file 112, and "optional" capabilities that are preferred to optimize the user experience but are not necessarily needed to open the file 112 and to enable interaction with the contents of the file 112. The receiving device 106 obtains the capabilities 132 for the contents of the file from the service provider 116.

The service provider 116 is configured to examine or evaluate the contents of the file 112 to generate the capabilities 132. For example, the capabilities 132 can be generated by the service provider 116 as the contents of the file 112 are generated and/or when the file 112 is stored in a user account. As described above, the capabilities 132 can be related to a way in which a user consumes the contents of the file 112 and/or is able to interact with the contents of the file 112. For example, a capability may be associated with a "comment only" feature that protects a user's original content in a file and only enables another user (e.g., a reviewer) to comment on the original content. In another example, a capability may be associated with a "voice comments" feature that enables data representing embedded voice comments to be displayed, selected, and upon selection, played-back to a user as an audible comment. In yet another example, a capability may be associated with a "tracked changes" feature that enables a viewer to see distinctions between original content and edited content (e.g., marked-up content). The capabilities can additionally or alternatively be generated based on features of a URL. For example, a portion of a URL can represent a capability, or instruction, of an application to navigate to a specific part of the file (e.g., a specific paragraph, a specific comment, a specific drawing, etc.). In another example, a portion of a URL can represent a capability associated with user permission to access the file, and thus, the capability is associated with a new authentication mechanism that may or may not be supported by an application.

The categorization of a capability 132 as a required or an optional capability can also be based on the contents of the file. For instance, if a file contains voice comments, the default action for the service may be to categorize a "voice comments" feature as an optional capability. However, if a first user specifically mentions a name of a second user in a voice comment, then the service may categorize a "voice comments" feature as a required capability (e.g., when a link is sent to a device of the second user).

In some examples, the service provider 116 considers or follows user input when generating and/or categorizing capabilities 132 for a file. For example, a user of the sending device 102 can provide input indicating that the "voice comments" feature is a required capability for any application that opens the file 112. The input can be provided when the link is generated for sharing purposes. Stated another way, the user can define required and/or optional capabilities when sharing the file. In various examples, the capabilities 132 defined by the user can generally be applied each time the file 112 is shared via a link. In alternative examples, the capabilities 132 defined by the user can be specifically applied on a per-share or per-link basis based on a particular user (of receiving device 106) to which the link and file 112 are being sent.

Figure 2A:
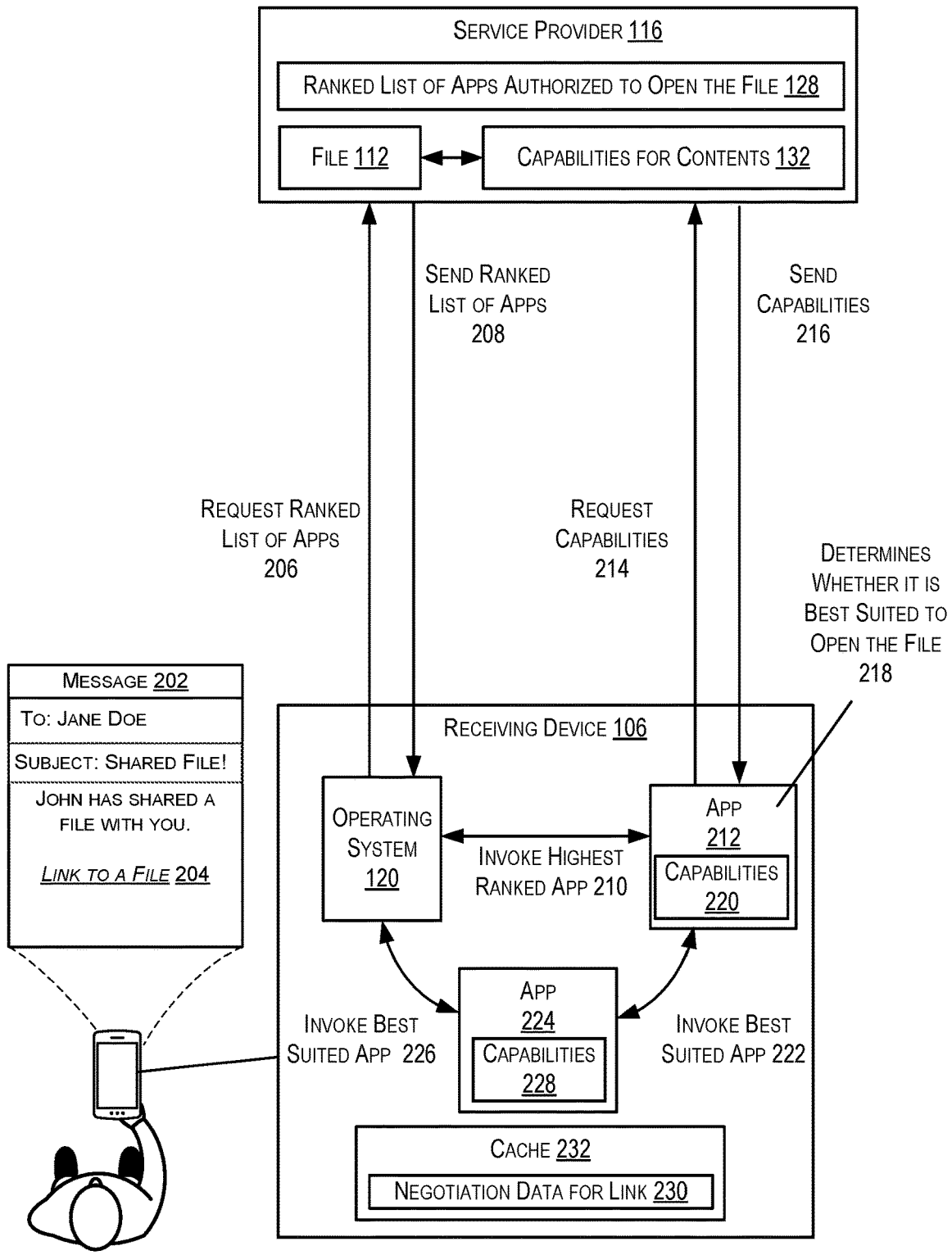
FIG. 2A includes a diagram that further illustrates the negotiation implemented to identify the best suitable application to open the file.

FIG. 2A includes a diagram 200 that further illustrates the negotiation implemented to identify the best suitable application to open the file, as described in FIG. 1. As shown in FIG. 2, a user opens a message 202 on his or her device (e.g., receiving device 106) and activates a link to a file 204. When this occurs, the operating system 120 of the receiving device is called upon to analyze (e.g., parse) a URL associated with the link to identify a pattern (e.g., a domain and/or a type of file). The operating system 120 uses the domain of the URL to obtain, from the service provider 116, the ranked list of applications that are authorized to open the file (e.g., based on its type). More specifically, the operating system 120 requests 206 the ranked list of applications 128 be provided, and based on the request 206, the service provider 116 sends 208 the ranked list of applications to the operating system 120.

Upon receiving the ranked list of applications 128 from the service provider 116, the operating system 120 reviews the ranked list of applications to identify the highest ranked application on the list that is also available to the operating system 120 and the receiving device 106. A client application is available to the operating system if it is installed on the device, and it is registered to open files accessed via the domain of the URL. A web application is available to the operating system via a browser installed on the device. The operating system 120 then invokes 210 the highest ranked application (e.g., application 212) to implement negotiations to determine if it is the best suitable application to open the file 112. More specifically, application 212 requests 214 the capabilities 132 for the contents of the file, and based on the request 214, the service provider 116 sends 216 the capabilities 132 to the application 212.

Upon receiving the capabilities 132 from the service provider 116, the application 212 determines 218 whether it is best suited to open the file. That is, the application 212 can compare the capabilities 220 that it possesses to the received capabilities 132 to determine 218 whether it is best suited to open the file. For example, the application 212 can determine whether the capabilities 220 it possesses satisfy the capabilities 132 (e.g., each of the capabilities 132 is matched with one of the capabilities 220), and if so, the application determines that it is best suited to open the file. In another example, the application 212 can determine whether the capabilities 220 it possesses satisfy the "required" capabilities 132 (e.g., each of the "required" capabilities 132 is matched with one of the capabilities 220), and if so, the application determines that it is best suited to open the file. In yet another example, the application 212 can determine whether the capabilities 220 it possesses best satisfy the capabilities 132, and if so, the application determines that it is best suited to open the file. While one or more capabilities 132 may be missing from the capabilities 220, the application 212 can determine that it can offer more capabilities than other applications available to the receiving device. This determination can be made based on an awareness of other experiences (e.g., other capabilities) of other applications available to the receiving device 106. For example, the service provider 116 can send information regarding whether an individual capability is supported by a web application. Other examples are described herein with respect to FIG. 2B.

In an event the application 212 determines that it is best suited to open the file 112 (e.g., the application possesses all the capabilities or at least all the required capabilities), the application 212 opens the file 112, as described above. However, in an event the application 212 determines that it is not best suited to open the file 112 (e.g., the application 212 is missing a capability that is provided or likely to be provided by an alternative application), the application 212 may invoke or launch 222 an application 224 that is available to the receiving device 106 and that is best suited to open the file. Alternatively, the application 212 can inform the operating system 120 of the outcome of its negotiation and the operating system 120 can invoke or launch 226 the application 224 that is available and that is best suited to open the file.

Once an application that is best suited to open the file is determined, details (e.g., negotiation data 230) related to how an outcome was determined can be stored in a cache 232, so that the negotiation does not have to be repeated when the link 204 is subsequently activated (e.g., the user accesses the message 202 again and clicks on the link). The caching reduces the time required to load the contents of the file 112 again and limits further network communications, thereby conserving resources. Moreover, the details can be used to intelligently determine if a previous outcome, as to which application is best suited to open the file, needs to be modified or overridden. For instance, the negotiation data 230 can capture reasons why an application was determined to be the best suitable application to open the file and/or why an application was not determined to be the best suitable application to open the file.

In a specific example, negotiation data 230 may indicate that when the link was first activated, a first application lacked a particular capability to open a file due to the fact a user had not installed the most recent update (e.g., version) to the first application, where the most recent update includes the particular capability. Accordingly, the negotiation data 230 stored in the cache 232 may indicate that when the link was first activated, an alternative application that was ranked lower on the list than the first application, but that had the particular capability was determined to be the best suitable application to open the file. In an event the user installs the most recent update to the first application after the user first activates the link but before the user subsequently activates the link, the negotiation data 230 in the cache 232 can be accessed to determine that now the first application has the particular capability which it previously did not have. Consequently, the first application, rather than the alternative application, can be used to open the file based on a subsequent activation of the link.

Compared to the conventional techniques that strictly follow an ordered ranking without regard to application capabilities that enable a user to view and/or interact with the contents of the file differently, the techniques described herein consider application capabilities when determining an application that is best suited to open the file. This provides greater flexibility on a per-link and/or a per file basis which thereby allows a user to view and/or interact with contents of a file in an improved and optimal manner.

Figure 2B:
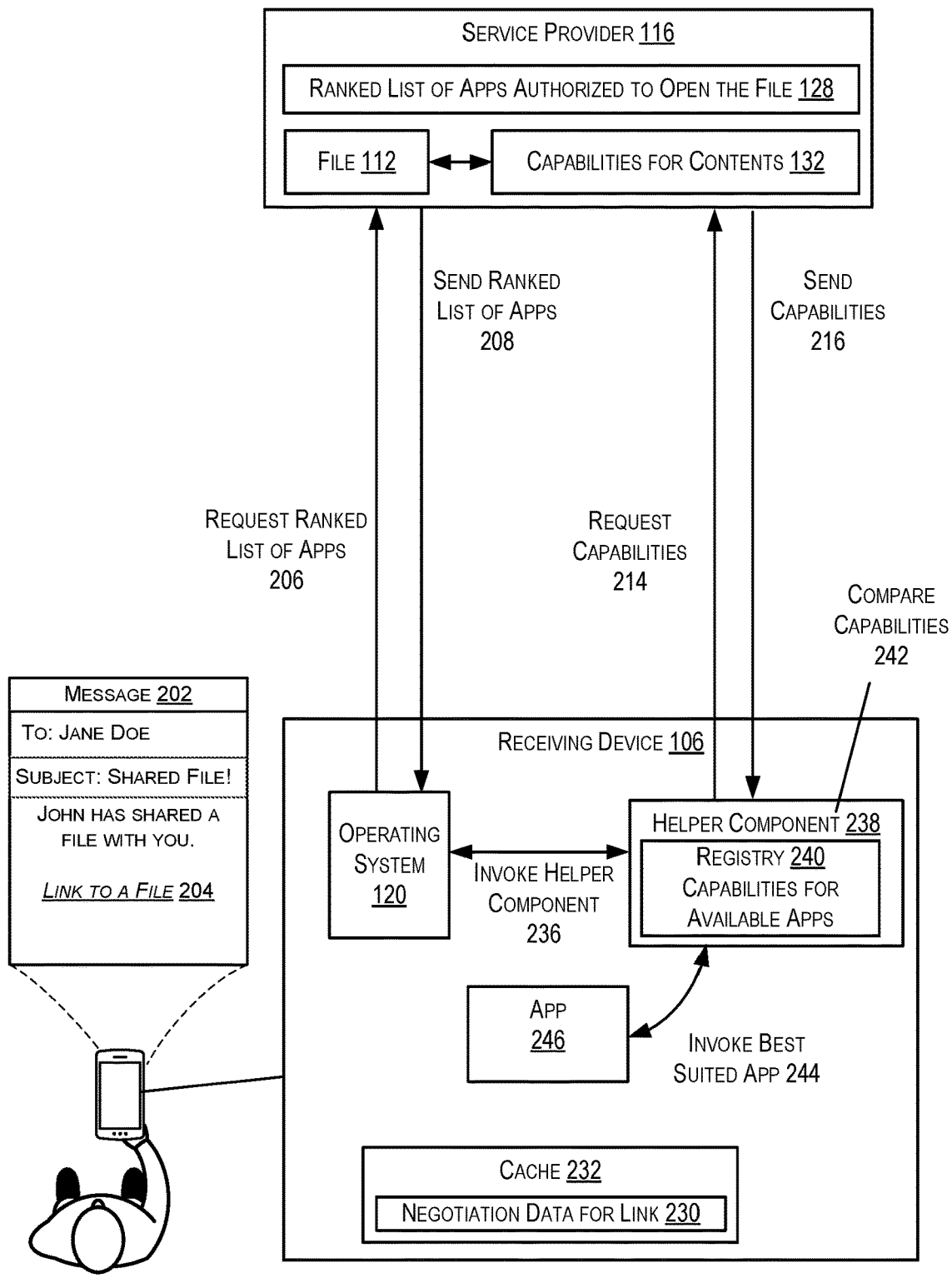
FIG. 2B includes a diagram that illustrates an alternative manner in which the best suitable application to open the file can be identified.

FIG. 2B includes a diagram 234 that illustrates an alternative manner in which the best suitable application to open the file can be identified. FIG. 2B includes elements illustrated in FIG. 2A. However, in FIG. 2B, the operating system 120, upon receiving the ranked list of applications, invokes 236 a helper component 238 rather than the highest ranked application. The helper component 238 can be part of the operating system 120, can be a separate application installed on the receiving device 106, or can be part of each of the individual applications registered and available to open the file. The helper component 238 is configured to coordinate capabilities of the available applications registered to open the file (e.g., client applications 122(1) through 122(N) and web application 124). To this end, the helper component 238 includes, or in some way has access to, a registry 240 that stores the capabilities of each of the available applications. Upon receiving the capabilities 132 associated with the contents of the file, the helper component 238 compares 242 the capabilities of the available applications to the received capabilities and determines which application available to the device is best suited to open the file (e.g., which application possesses capabilities that best match or best satisfy the capabilities received from the service). For example, the helper component 238 can identify the application that has a highest number of capability matches. In the event of a tie (e.g., two or more applications can support all the capabilities associated with the file), the device can select the application that is the highest ranked on the list. The helper component 238 can then invoke 244 the best suited application 246 to open the file.

FIGS. 3-5 and 7 each contain flowcharts of methods. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

Additionally, the operations described herein can be implemented as a sequence of computer implemented acts or program modules running on a computing system (e.g., receiving device 106 and/or system 114).

Figure 3:
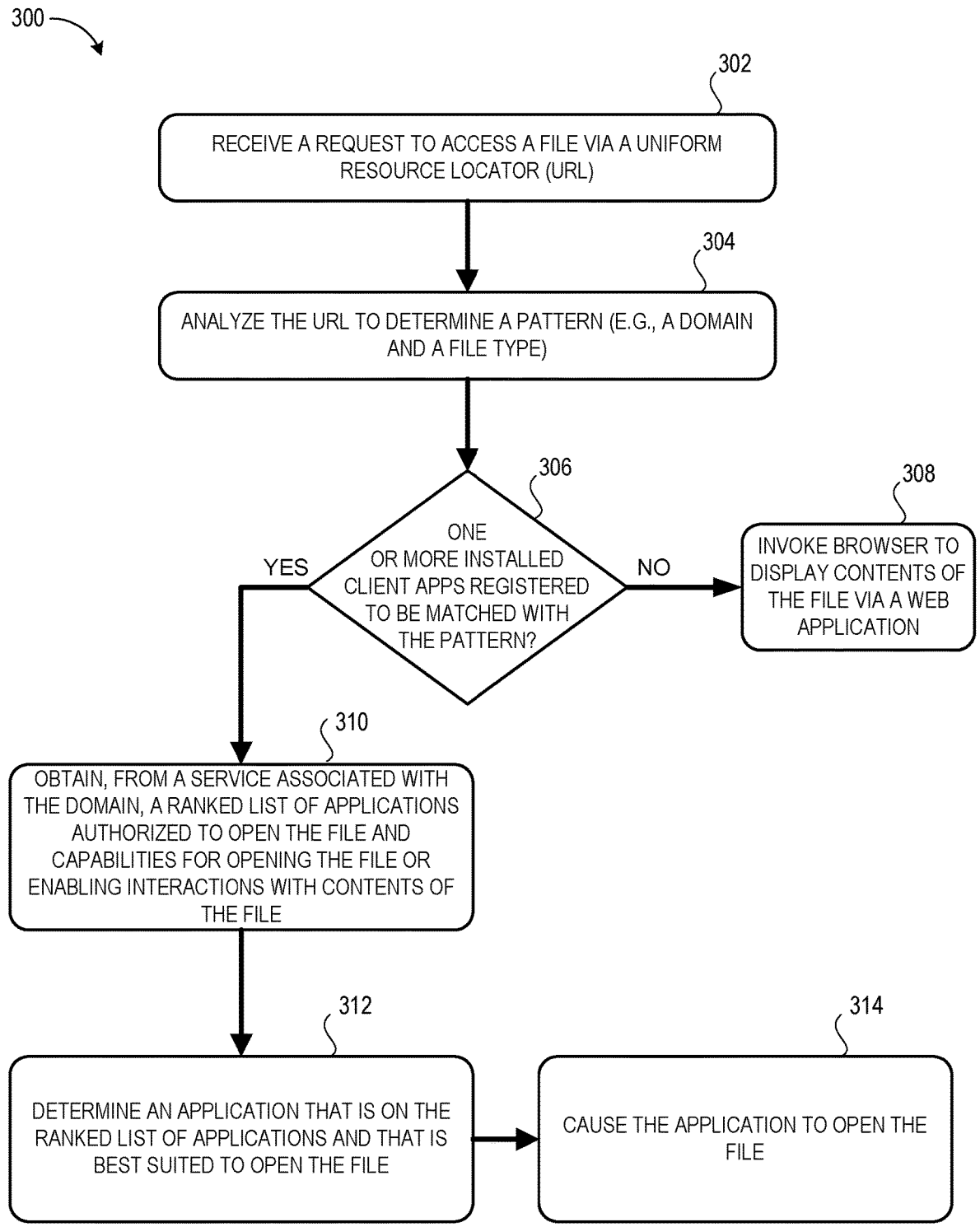
FIG. 3 is a diagram of an example flowchart that illustrates operations directed to determining an application that is best suited to open a file of a particular type, the file made accessible via a URL.

FIG. 3 is a diagram of an example flowchart 300 that illustrates operations directed to determining an application that is best suited to open a file of a particular type, the file made accessible via a URL.

At operation 302, a request to access a file via a URL is received. The request can be received by an operating system of a device based on activation of a link (e.g., shared via a communication).

At operation 304, the URL is analyzed to determine a pattern of the URL (e.g., a domain and/or a file type of the file). As described above, the domain may identify a service associated with the storage of the file on a network.

At operation 306, it is determined whether one or more client applications are installed on the device and are registered to be matched with the pattern (e.g., to open files, of the file type, that are accessed via the domain). If there are not any client applications installed on the device and registered to open the file (e.g., "No"), the process proceeds to operation 308 where a browser is invoked, by the operating system for example, to display the contents of the file via a web application accessible via the domain.

However, if there are one or more client applications that are installed on the device and that are registered to open the file (e.g., "Yes"), the process proceeds to operation 310 where a ranked list of applications authorized to open the file is obtained from a service associated with the domain. Furthermore, capabilities associated with opening the file and/or interacting with contents of the file can be obtained along with the ranked list of applications.

At operation 312, an application that is on the ranked list of applications and that is best suited to open the file is determined (e.g., an application that possesses the capabilities obtained in operation 310). For example, as described with respect to FIG. 2A, a client application can determine whether it possesses the capabilities associated with the contents of the file, or whether an alternative application (e.g., a web application) possesses a capability that the client application is missing. In another example, as described with respect to FIG. 2B, a helper component can compare the associated with the contents of the file to stored capabilities of each of the applications, and determine which application is best suited to open the file.

At operation 314, the application is caused (e.g., launched) to open the file. In various examples, the contents of the file can be displayed to a user and interacted with by the user.

Figure 4:
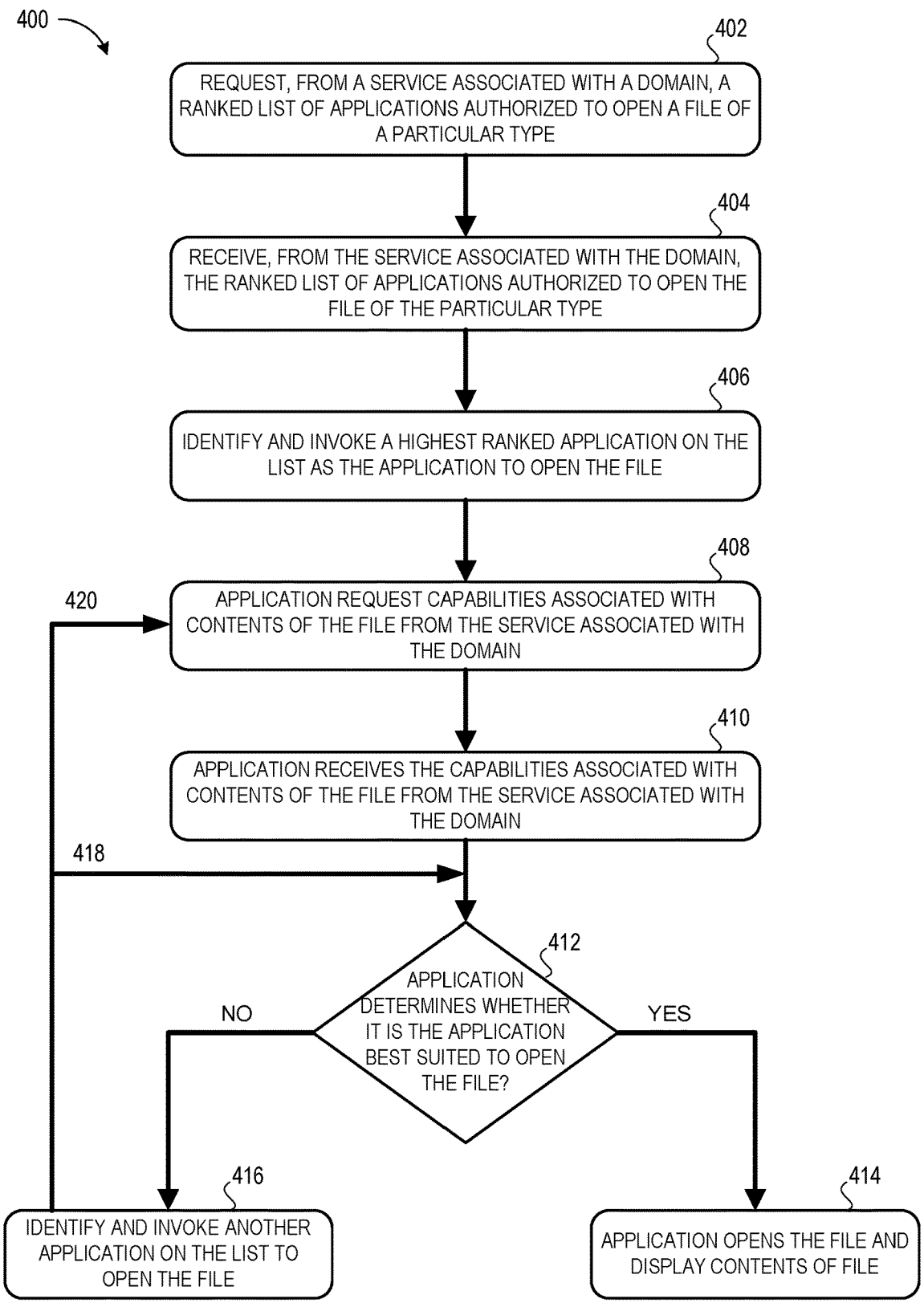
FIG. 4 is a diagram of an example flowchart that illustrates operations directed to obtaining a ranked list of applications authorized to open a file and capabilities associated with contents of the file which are useable to determine an application that is best suited to open a file of a particular type, the file made accessible via a URL.

FIG. 4 is a diagram of an example flowchart 400 that illustrates operations directed to obtaining a ranked list of applications authorized to open a file and capabilities associated with contents of the file which are useable to determine an application that is best suited to open a file of a particular type (e.g., a way of implementing operation 310 in FIG. 3), the file made accessible via a URL.

At operation 402, an operating system requests a ranked list of applications authorized to open a file of a particular type from a service associated with a domain.

At operation 404, the operating system receives the ranked list of applications authorized to open the file of the particular type from the service associated with the domain.

At operation 406, the operating system identifies and invokes a highest ranked application on the list to open the file. The highest ranked application identified and invoked is an application available on the device.

At operation 408, the application (e.g., the highest ranked application) requests capabilities associated with contents of the file from the service associated with the domain.

At operation 410, the application receives the capabilities associated with the contents of the file from the service associated with the domain.

At operation 412, the application determines whether it is the application best suited to open the file. For example, if the application possesses capabilities that match the received capabilities, the application determines at operation 412 that it is the application best suited to open the file (e.g., "Yes") and the process proceeds to operation 414 where the application opens the file and displays contents of the file. In another example, if the application can offer more capabilities than other applications available on the device, the application determines at operation 412 that it is the application best suited to open the file (e.g., "Yes") and the process proceeds to operation 414 where the application opens the file and displays contents of the file. This determination can be made based on an awareness of other experiences (e.g., other capabilities) of other applications available on the device.

If the application determines at operation 412 that it is not the application best suited to open the file (e.g., "No"), for example, due to a missing capability, the process proceeds to operation 416 where another application is identified and invoked to open the file. In one example, the other application is a web application. In another example, the other application is the next highest ranked application on the list that is available on the device. In yet another example, the other application is an application installed on the device that is not on the list.

In various embodiments, the process can further proceed to follow a first path 418 that returns to operation 412 where the other application determines whether it is the application best suited to open the file. In alternative embodiments, the process can further proceed to follow a second path 420 where the other application requests capabilities associated with contents of the file from the service associated with the domain. Thus, FIG. 4 illustrates operations that can be repeated by different applications on the ranked list to determine which application is best suited to open the file.

Figure 5:
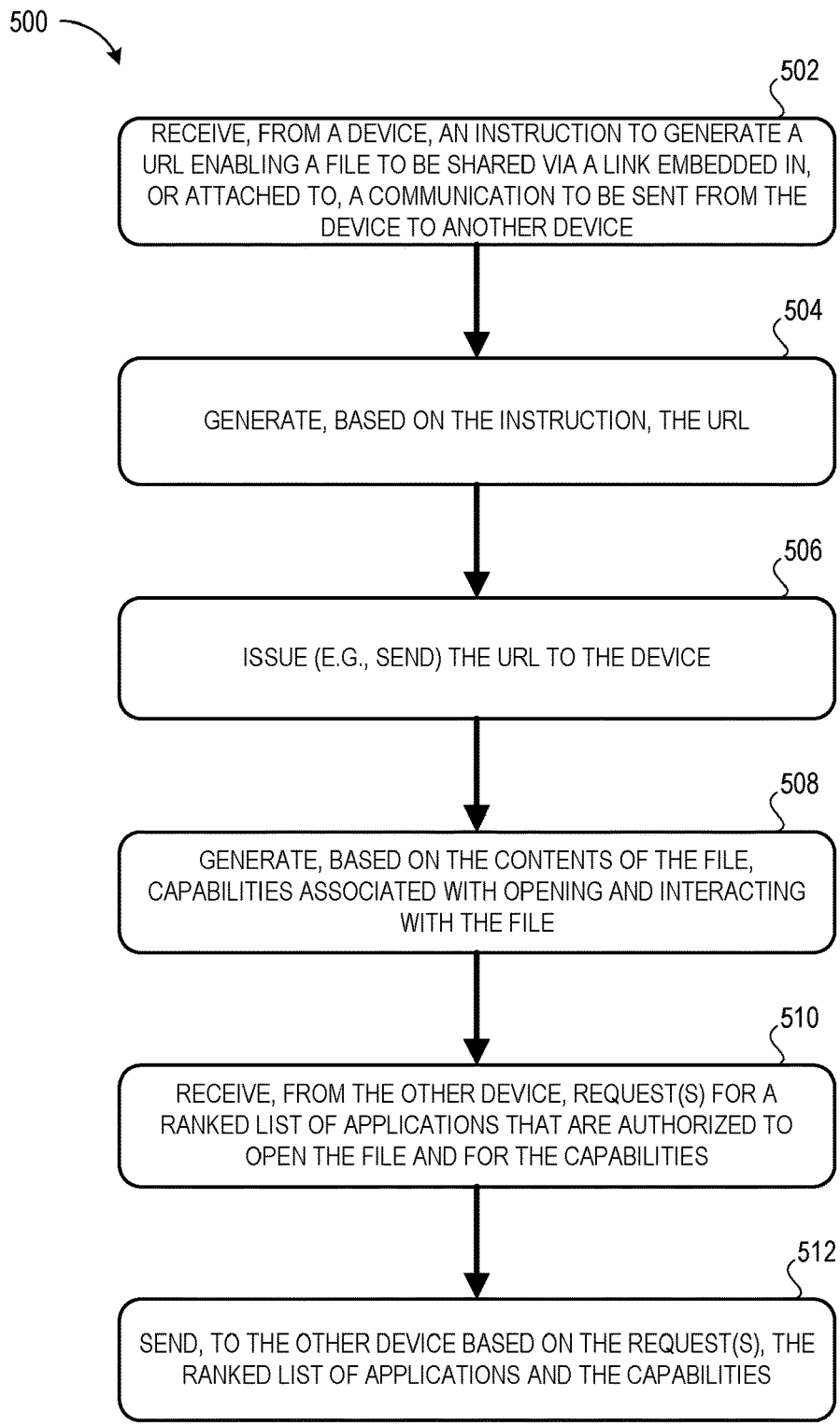
FIG. 5 is a diagram of an example flowchart that illustrates operations directed to generating a URL and capabilities associated with contents of a file and providing a ranked list of applications authorized to open the file and the capabilities to a requesting device, so they can be used to determine an application that is best suited to open the file.

FIG. 5 is a diagram of an example flowchart 500 that illustrates operations directed to generating a URL and capabilities associated with contents of a file and providing a ranked list of applications authorized to open the file and the capabilities to a requesting device, so they can be used to determine an application that is best suited to open the file.

At operation 502, an instruction to generate a uniform resource locator is received from a device (e.g., sending device 102). The uniform resource locator enables a file to be shared via a link embedded in a communication to be sent from the device to another device (e.g., the receiving device 106).

At operation 504, the uniform resource locator is generated based on the received instruction.

At operation 506, the uniform resource locator is issued (e.g., sent) to the device.

At operation 508, capabilities associated with opening the file or enabling interactions with contents of the file are generated based on the contents of the file.

At operation 510, request(s) is/are received from the other device, the request(s) for a ranked list of applications that are authorized to open the file and for the capabilities.

At operation 512, the ranked list of applications that are authorized to open the file and the capabilities are sent to the other device based on the request. In this way, the other device can determine which application, out of multiple available applications, is best suited to open the file.

Figure 6:
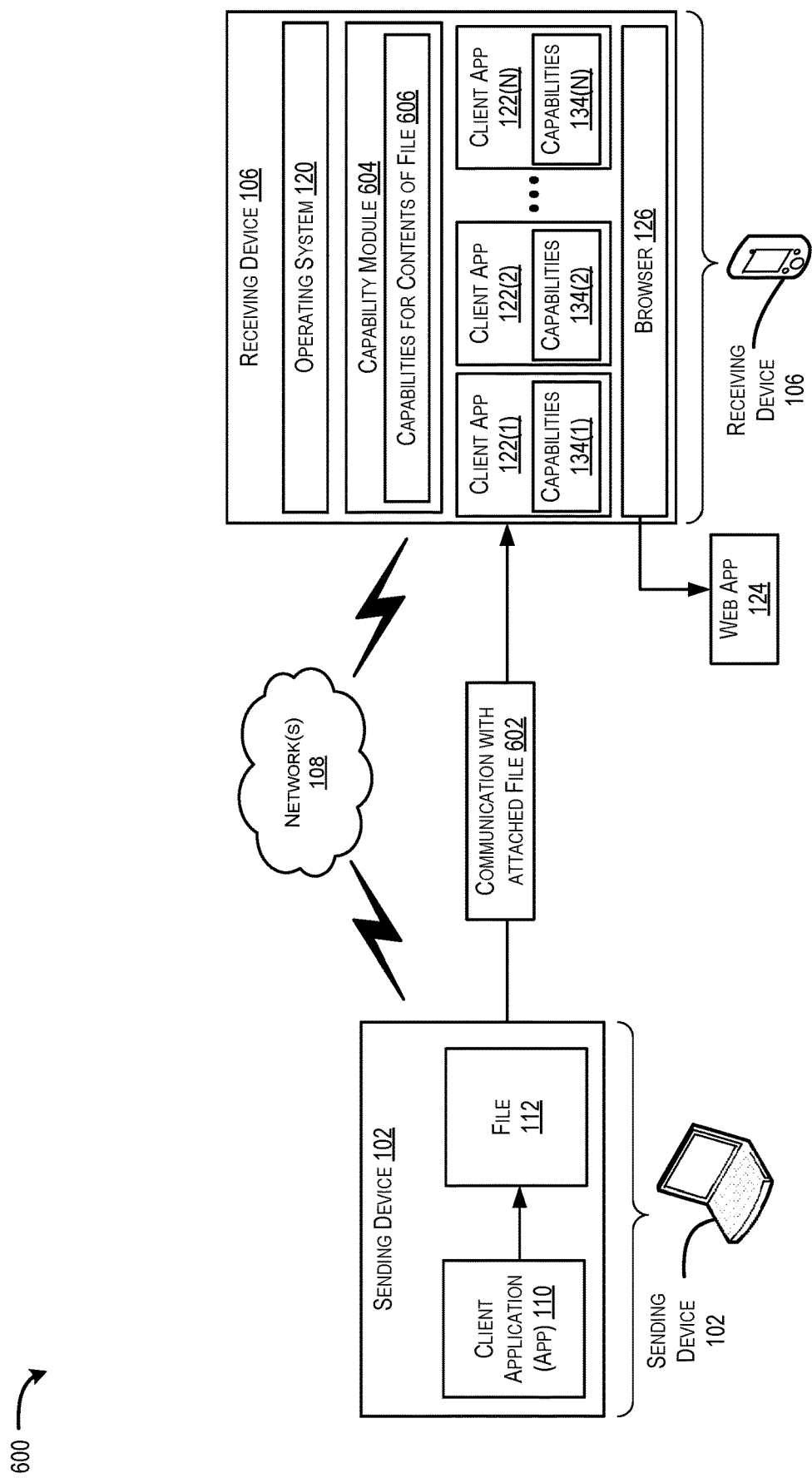
FIG. 6 includes a diagram that illustrates an example environment in which a file is shared as an attachment and a best suitable application to open the file is determined.

FIG. 6 includes a diagram 600 that illustrates an example environment in which a file is shared as an attachment and a best suitable application to open the file is determined. FIG. 6 includes elements illustrated in FIG. 1. However, FIG. 6 does not rely upon a service provider to access a file and determine the best suitable application to open the file. Rather, the sending device 102 in FIG. 6 generates a communication 602 to which the file 112 is attached and transmits the communication 602 to the receiving device 106 via network(s) 108. Upon receiving the communication 602, a capability module 604 on the receiving device 106 is configured to scan the file to determine a particular type of the file and one or more capabilities 606 associated with opening the file or enabling interactions with contents of the file. Once the capabilities 606 are determined, components of the receiving device (e.g., the operating system, a client application, a helper application, etc.) can determine which application (e.g., one of client applications 122(1) through 122(N) or web application 214) is best suited to open the file, in accordance with the techniques described above.

Figure 7:
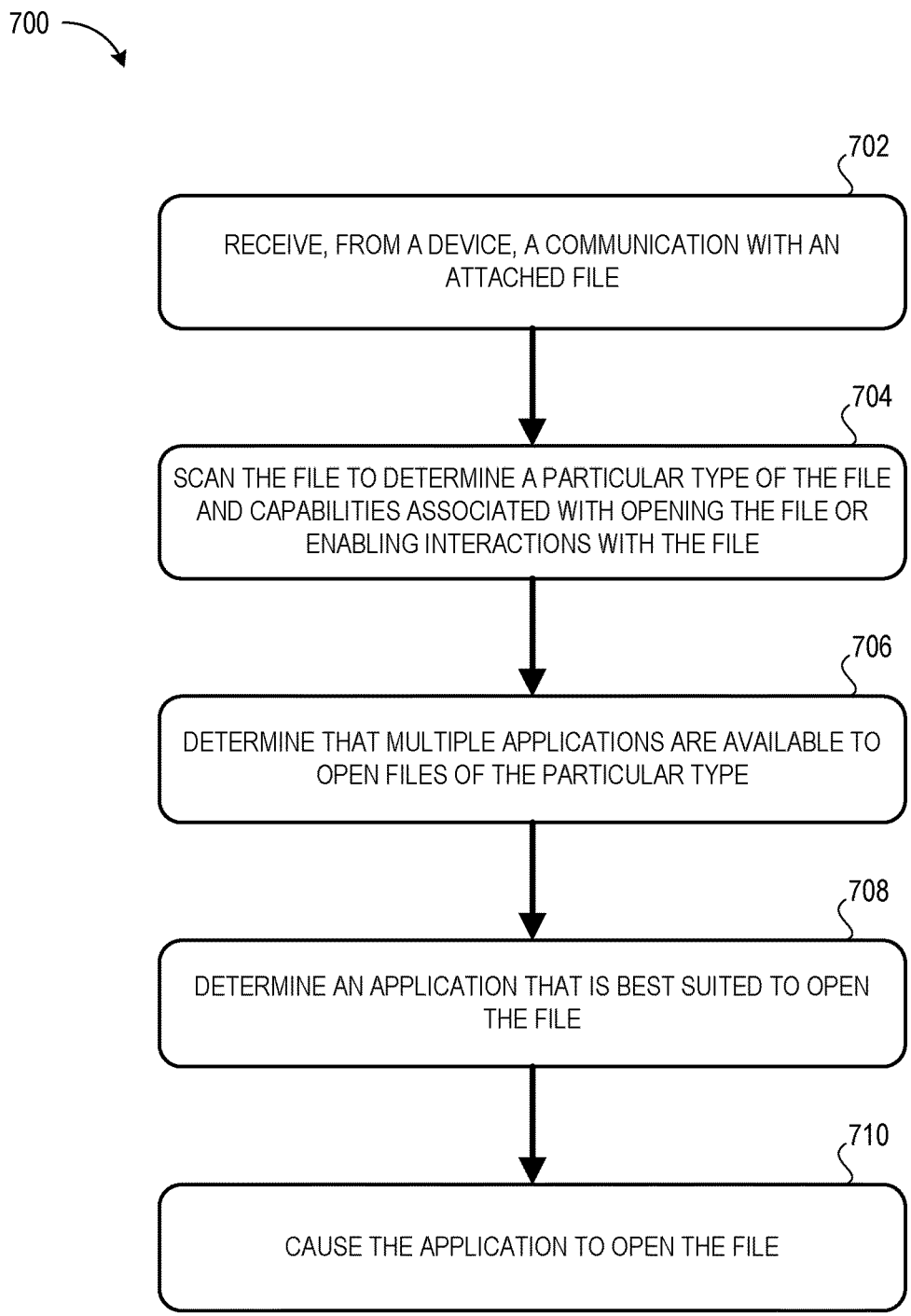
FIG. 7 is a diagram of an example flowchart that illustrates operations directed to determining a best suitable application to open a file that is attached to a communication.

FIG. 7 is a diagram of an example flowchart 700 that illustrates operations directed to determining a best suitable application to open a file that is attached to a communication. The operations may be performed by the receiving device 106 illustrated in FIG. 6.

At operation 702, a communication with an attached file is received from a device.

At operation 704, the file is scanned to determine a particular type of the file and capabilities associated with opening the file or enabling interactions with the file.

At operation 706, it is determined that multiple applications are available, to the device, to open files of the particular type.

At operation 708, an application that is best suited to open the file is determined.

At operation 710, the application is caused (e.g., launched) to open the file. In various examples, the contents of the file can be displayed to a user and interacted with by the user.

Figure 8:
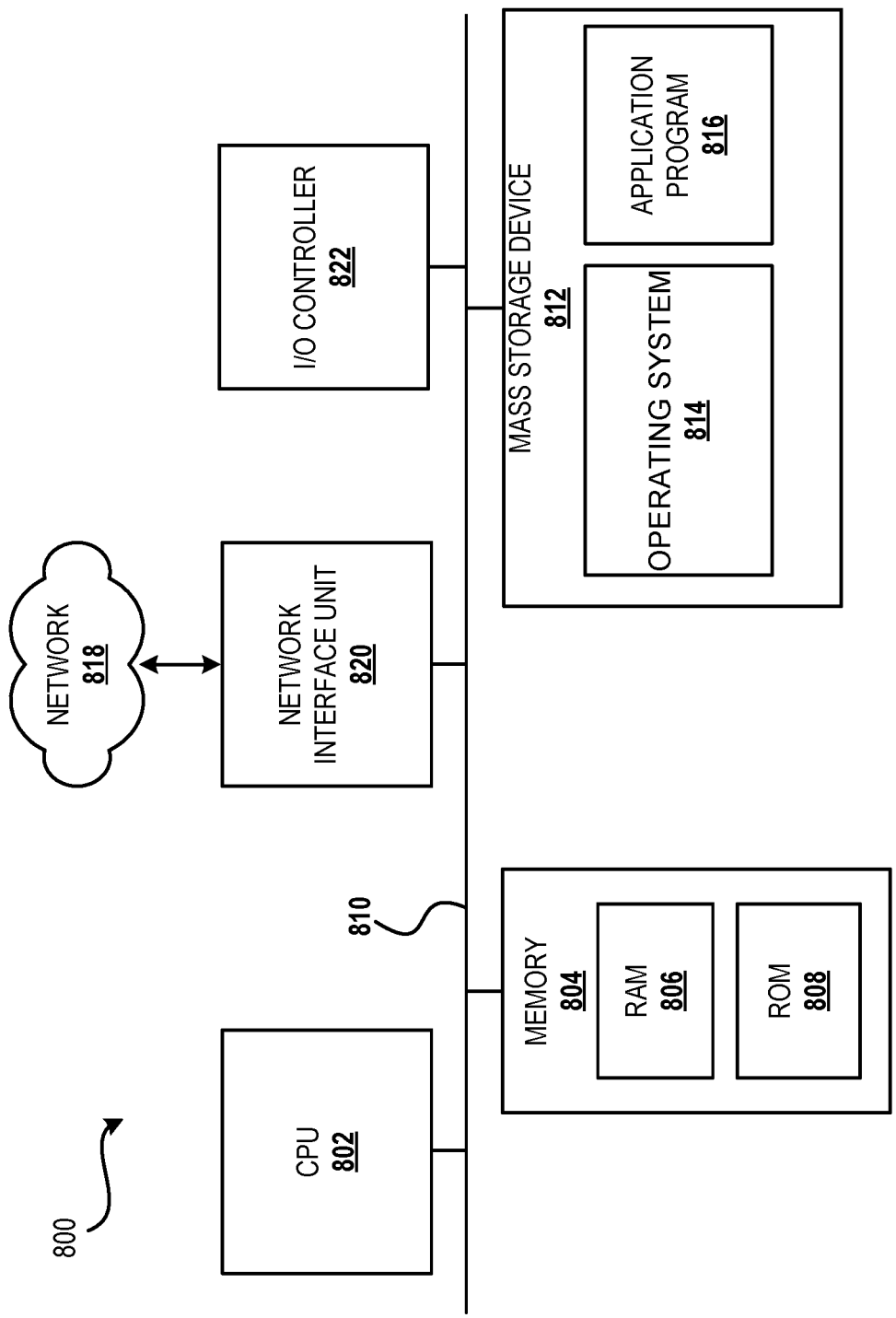
FIG. 8 is a computer architecture diagram illustrating an illustrative computer hardware and software architecture for a computing device and/or system capable of implementing aspects of the techniques and technologies presented herein.

FIG. 8 shows additional details of an example computer architecture 800 for a computer or a device (e.g., the sending device 102, the receiving device 106, or a device of the system 114), capable of executing the techniques described herein. Thus, the computer architecture 800 illustrates an example architecture for a server computer, a mobile phone, a PDA, a smart phone, a desktop computer, a netbook computer, a tablet computer, and/or a laptop computer.

The computer architecture 800 includes a central processing unit 602 ("CPU"), a system memory 804, including a random access memory 806 ("RAM") and a read-only memory ("ROM") 808, and a system bus 810 that couples the memory 804 to the CPU 802. A basic input/output system containing the basic routines that help to transfer information between elements within the computer architecture 800, such as during startup, is stored in the ROM 808. The computer architecture 800 further includes a mass storage device 812 for storing an operating system 814 (e.g., operating system 120) and one or more application programs 816 (e.g., client applications 122(1) through 122(N) and a browser 126).

The mass storage device 812 is connected to the CPU 802 through a mass storage controller connected to the bus 810. The mass storage device 812 and its associated computer-readable media provide non-volatile storage for the computer architecture 800. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 800. For purposes of the claims, the phrase "computer storage medium," "computer-readable storage medium" and variations thereof, does not include waves, signals, and/or other transitory and/or intangible communication media, per se.

According to various configurations, the computer architecture 800 may operate in a networked environment using logical connections to remote computers through the network 818. The computer architecture 800 may connect to the network 818 through a network interface unit 820 connected to the bus 810. It should be appreciated that the network interface unit 820 also may be utilized to connect to other types of networks and remote computer systems. The computer architecture 800 also may include an input/output controller 822 for receiving and processing input from a number of other devices, including a keyboard, mouse, or electronic stylus. Similarly, the input/output controller 822 may provide output to a display screen, a printer, or other type of output device.

It should be appreciated that the software components described herein may, when loaded into the CPU 802 and executed, transform the CPU 802 and the overall computer architecture 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding software modules to implement the techniques described herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 800 in order to store and execute the software components presented herein. It also should be appreciated that the computer architecture 800 may include other types of computing devices, including hand-held computers, embedded computer systems, personal digital assistants, and other types of computing devices known to those skilled in the art. It is also contemplated that the computer architecture 800 may not include all of the components shown in FIG. 8, may include other components that are not explicitly shown in FIG. 8, or may utilize an architecture completely different than that shown in FIG. 8.

Figure 9:
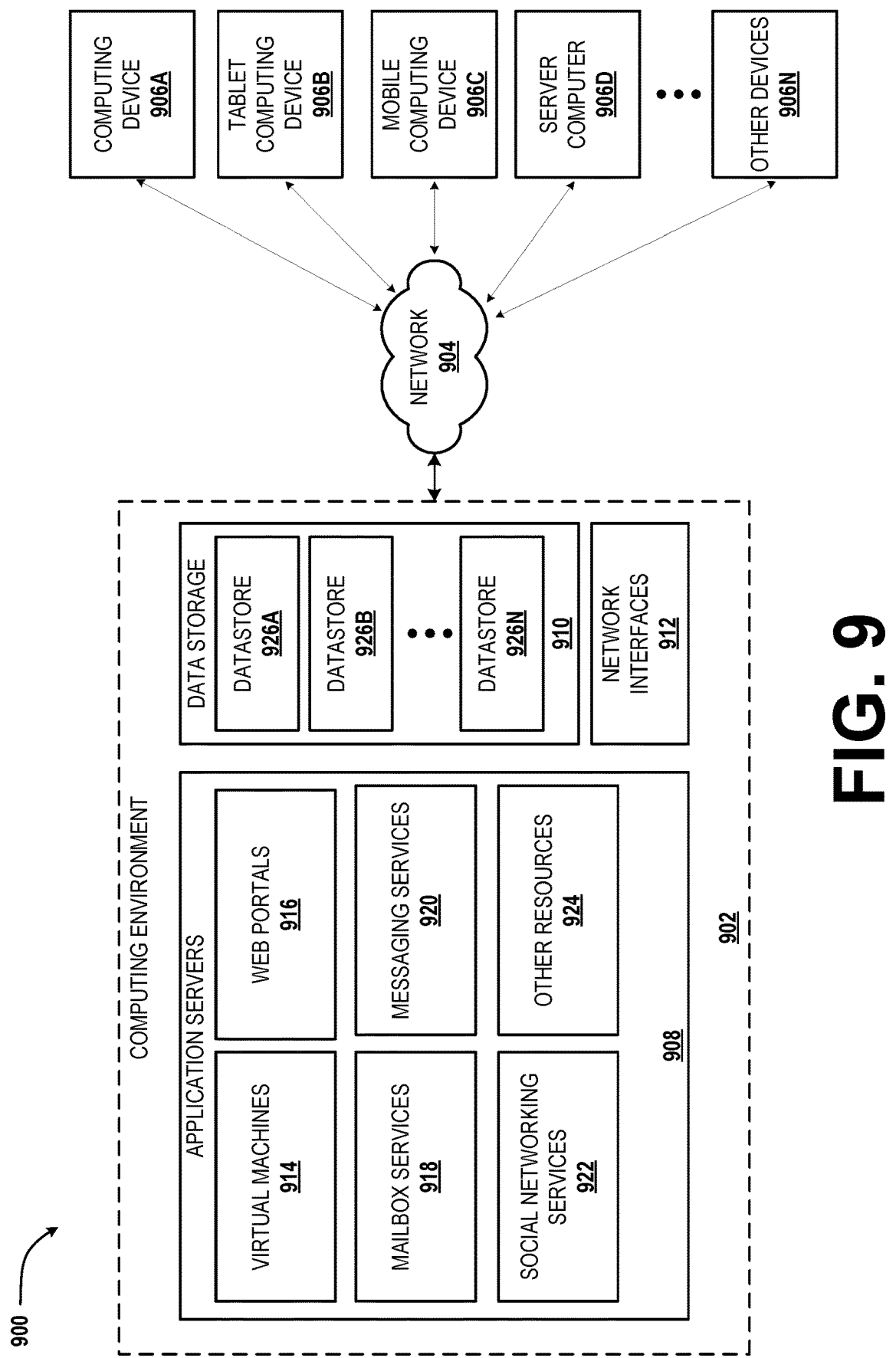
FIG. 9 is a diagram illustrating a distributed computing environment capable of implementing aspects of the techniques and technologies presented herein.

FIG. 9 depicts an illustrative distributed computing environment 900. According to various implementations, the distributed computing environment 900 includes a computing environment 902 operating on, in communication with, or as part of the network 904. The computing environment 902 can be associated with the system 114 of FIG. 1 and can be operated to provide a service. The network 904 may be or may include the network 818 and/or network(s) 108. The network 904 also can include various access networks. One or more client devices 906A-906N (hereinafter referred to collectively and/or generically as "clients 906" and also referred to herein as computing devices) can communicate with the computing environment 902 via the network 904 and/or other connections. In one illustrated configuration, the clients 906 include a computing device 906A such as a laptop computer, a desktop computer, or other computing device; a slate or tablet computing device ("tablet computing device") 906B; a mobile computing device 906C such as a mobile telephone, a smart phone, or other mobile computing device; a server computer 906D; and/or other devices 906N. It should be understood that any number of clients 906 can communicate with the computing environment 902. It should be understood that the illustrated clients 906 and computing architectures illustrated and described herein are illustrative and should not be construed as being limited in any way. Each client 906 can be used to collect input signals and share them between different clients.

In the illustrated configuration, the computing environment 902 includes application servers 908, data storage 910, and one or more network interfaces 912. According to various implementations, the functionality of the application servers 908 can be provided by one or more server computers that are executing as part of, or in communication with, the network 904. The application servers 908 can host various services, virtual machines, portals, and/or other resources. In the illustrated configuration, the application servers 908 host one or more virtual machines 914 for hosting applications or other functionality. According to various implementations, the virtual machines 914 host one or more applications and/or software modules for enabling the generation of links and/or capabilities for a file, as described above. It should be understood that this configuration is illustrative and should not be construed as being limiting in any way. The application servers 908 also host or provide access to one or more link pages or files, Web sites, and/or other information ("Web portals") 916.

According to various implementations, the application servers 908 also include one or more mailbox services 918 and one or more messaging services 920. The mailbox services 918 can include electronic mail ("email") services. The mailbox services 918 also can include various personal information management ("PIM") and presence services including, but not limited to, calendar services, contact management services, collaboration services, and/or other services. The messaging services 920 can include, but are not limited to, instant messaging services, chat services, forum services, and/or other communication services.

The application servers 908 also may include one or more social networking services 922. The social networking services 922 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 922 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 922 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 922 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 922 are not mentioned herein for the sake of brevity. As such, the above configurations are illustrative, and should not be construed as being limited in any way. According to various implementations, the social networking services 922 may host one or more applications and/or software modules for providing the functionality described herein, such as enabling the generation of content from multiple applications. For instance, any one of the application servers 908 may communicate or facilitate the functionality and features described herein. For instance, a social networking application, mail client, messaging client or a browser running on a phone or any other client 906 may communicate with a networking service 922 and facilitate the functionality, even in part, described above with respect to FIG. 9. Any device or service depicted herein can be used as a resource for supplemental data, including email servers, storage servers, etc.

As shown in FIG. 9, the application servers 908 also can host other services, applications, portals, and/or other resources ("other resources") 924. The other resources 924 can include, but are not limited to, document sharing, rendering or any other functionality. The other resources 924 can also include a machine learning engine for processing and generating historical user activity data. It thus can be appreciated that the computing environment 902 can provide integration of the concepts and technologies disclosed herein with various mailbox, messaging, social networking, and/or other services or resources.

As mentioned above, the computing environment 902 can include the data storage 910. According to various implementations, the functionality of the data storage 910 is provided by one or more databases operating on, or in communication with, the network 904. The functionality of the data storage 910 also can be provided by one or more server computers configured to host data for the computing environment 902. The data storage 910 can include, host, or provide one or more real or virtual datastores 926A-926N (hereinafter referred to collectively and/or generically as "datastores 926"). The datastores 926 are configured to host data used or created by the application servers 908 and/or other data. The datastores 926 also can host or store web page documents, text processing documents, presentation documents, data structures, algorithms for execution by a recommendation engine, and/or other data utilized by any application program or another module. Aspects of the datastores 926 may be associated with a service for storing files.

The computing environment 902 can communicate with, or be accessed by, the network interfaces 912. The network interfaces 912 can include various types of network hardware and software for supporting communications between two or more computing devices including, but not limited to, the computing devices and the servers. It should be appreciated that the network interfaces 912 also may be utilized to connect to other types of networks and/or computer systems.

It should be understood that the distributed computing environment 900 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 900 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 900 to utilize the functionality described herein for providing the techniques disclosed herein, among other aspects.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method comprising:
receiving, by an operating system of a device, a request to access a resource via a uniform resource locator included in a communication;
analyzing, by the operating system of the device, the uniform resource locator to determine a pattern of the uniform resource locator;
determining that multiple applications, installed on the device, have previously registered to open resources that are associated with the pattern;
obtaining, by the operating system of the device and from a network service associated with the uniform resource locator, a ranked list of applications authorized to open the resource;
identifying, by the operating system of the device and based on the ranked list of applications, a highest ranked application of the multiple applications;
invoking the highest ranked application to open the resource;
obtaining, by the highest ranked application and from the network service associated with the uniform resource locator, one or more capabilities associated with at least one of opening the resource or enabling interactions with contents of the resource, the one or more capabilities being generated based on the contents of the resource;
determining whether the highest ranked application possesses the one or more capabilities; and
opening the resource based on the determining whether the highest ranked application possesses the one or more capabilities.

2. The method of claim 1, wherein the determining whether the highest ranked application possesses the one or more capabilities comprises determining that the highest ranked application is missing a capability of the one or more capabilities, the method further comprising invoking an alternative application that possesses the one or more capabilities, wherein the resource comprises a file that is opened by the alternative application.

3. The method of claim 2, wherein the alternative application comprises a web application accessible via a browser installed on the device.

4. The method of claim 2, wherein the missing capability is categorized as a required capability.

5. The method of claim 1, wherein the one or more capabilities are generated based on user input.

6. The method of claim 5, wherein the user input is provided in association with generation and transmission of a link that comprises, or is associated with, the uniform resource locator.

7. The method of claim 1, wherein the determining whether the highest ranked application possesses the one or more capabilities comprises determining that the highest ranked application possesses the one or more capabilities, and wherein the resource is opened by the highest ranked application.

8. The method of claim 1, wherein an application possesses a capability based on a feature being available or enabled for use.

9. The method of claim 1, wherein the pattern is indicative of at least one of a domain and a type of resource.

10. A device comprising:
one or more processing units; and
a computer-readable storage medium having encoded thereon computer-executable instructions to cause the one or more processing units to:
analyze a uniform resource locator to determine a pattern of the uniform resource locator;
determine that multiple applications are available to open a resource that is associated with the pattern;
obtain, from a network service associated with the uniform resource locator, a ranked list of applications that are authorized to open the resource and one or more capabilities associated with at least one of opening the resource or enabling interactions with contents of the resource, the one or more capabilities being generated based on the contents of the resource; and
determine an application, of the multiple applications, that is on the ranked list of applications and that is suited to open the resource based on a comparison between capabilities possessed by the application and the one or more capabilities; and
cause the application to open the resource.

11. The device of claim 10, wherein the computer-executable instructions further cause the one or more processing units to:
determine that a highest ranked application, of the multiple applications, that is on the ranked list of applications is missing a capability of the one or more capabilities; and
identify, based on the ranked list of applications, the application as a next highest ranked application, of the multiple applications, that is on the ranked list of applications.

12. The device of claim 11, wherein the computer-executable instructions further cause the one or more processing units to:
cache, in association with the uniform resource locator at a first time, data indicating that the highest ranked application is missing the capability;
determine, at a second time after the first time, that the resource associated with the uniform resource locator is to be accessed;
access the cache to determine that the highest ranked application was previously missing the capability;
determine that an update to the highest ranked application has been installed on the device between the first time and the second time, the update providing the capability that was previously missing; and
cause the highest ranked application to open the resource based at least in part on the determining that the update to the highest ranked application has been installed on the device between the first time and the second time.

13. The device of claim 11, wherein the missing capability is categorized as a required capability, and wherein the required capability is categorized based on user input provided in association with generation and transmission of a link that comprises, or is associated with, the uniform resource locator.

14. The device of claim 10, wherein the application comprises a web application accessible via a browser installed on the device.

15. The device of claim 10, wherein the application comprises a client application installed on the device.

16. The device of claim 10, wherein an application has a capability based on a feature being available or enabled for use.

17. The device of claim 10, wherein the determining the application that is on the ranked list of applications and that is suited to open the resource comprises accessing a registry that stores capabilities possessed by each of the multiple applications, and identifying the application based on a number of matches between the capabilities possessed by the application and the one or more capabilities.

18. A device comprising:
one or more processing units; and
a computer-readable storage medium having encoded thereon computer-executable instructions to cause the one or more processing units to:
scan a file received as an attachment to a communication to determine a particular type of the file and one or more capabilities associated with at least one of opening the file or enabling interactions with contents of the file;
determine that multiple applications are available to the device to open files that are of the particular type; and
determine an application, of the multiple applications, that is suited to open the file based on a comparison between capabilities possessed by the application and the one or more capabilities; and
cause the application to open the file.

19. The device of claim 18, wherein an application has a capability based on a feature being available or enabled for use.

20. The device of claim 18, wherein the determining the application that is suited to open the file comprises accessing a registry that stores capabilities possessed by each of the multiple applications, and identifying the application based on a number of matches between the capabilities possessed by the application and the one or more capabilities.

* * * * *